United States Patent [19]

Murphy

[11] Patent Number: 5,219,403
[45] Date of Patent: Jun. 15, 1993

[54] PLASTIC SELF-INSULATING DUCTWORK SYSTEM

[75] Inventor: Gerard C. Murphy, 414 Garden Oaks Blvd., Houston, Tex. 77018

[73] Assignee: Gerard C. Murphy, Houston, Tex.

[21] Appl. No.: 826,767

[22] Filed: Jan. 28, 1992

Related U.S. Application Data

[60] Division of Ser. No. 652,463, Feb. 7, 1991, Pat. No. 5,095,942, which is a continuation-in-part of Ser. No. 479,870, Feb. 14, 1990, abandoned.

[51] Int. Cl.$^5$ .............................. F24F 7/04; F16L 9/18
[52] U.S. Cl. ................................ 137/561 A; 138/149; 138/162; 138/163; 454/903; 454/330
[58] Field of Search ............... 138/149, 140, 162, 163; 454/903, 330; 137/561 A

[56] References Cited

U.S. PATENT DOCUMENTS

| | | |
|---|---|---|
| 2,433,071 | 6/1948 | Honerkamp et al. |
| 2,489,048 | 11/1949 | Rinehart |
| 2,755,136 | 7/1956 | Lum |
| 3,095,014 | 6/1963 | Dosker .................... 138/162 X |
| 3,126,444 | 3/1964 | Taylor ..................... 138/163 X |
| 3,886,981 | 6/1975 | Eliason ................... 138/163 X |
| 3,985,158 | 10/1976 | Felter |
| 4,287,245 | 9/1981 | Kikuchi ................... 138/162 X |
| 4,557,297 | 12/1985 | Montana ................. 138/149 X |
| 4,706,711 | 11/1987 | Czvikovsky et al. .... 138/149 X |
| 4,735,235 | 4/1988 | Anderson et al. ...... 138/149 X |
| 4,951,716 | 8/1990 | Tsunoda et al. ........ 138/162 |

*Primary Examiner*—Arnold Rosenthal
*Attorney, Agent, or Firm*—Browning, Bushman, Anderson & Brookhart

[57] ABSTRACT

The present invention relates to a system of adjustable preformed ductwork for the conveyance of a fluid. The system uses a distribution box which includes an upper portion having a plurality of walls and a bottom plate. The distribution box may act either as a diffuser boot or as a splitter box. The distribution box is joined to interconnecting duct lines by adaptor conduits. The adaptor conduits are duct line which are adapted at one end for connection to an opening in a wall and are adapted at the other end for connection to adjoining duct line. A valve having a housing, a first cone and a second cone is also included in the system either in a duct line or in an adaptor conduit. The first and the second cone have matching apertures. The second cone is rotatable within the first cone such that the matching apertures may be selectively aligned or misaligned to adjust the flow of the fluid through the ductwork system.

6 Claims, 5 Drawing Sheets

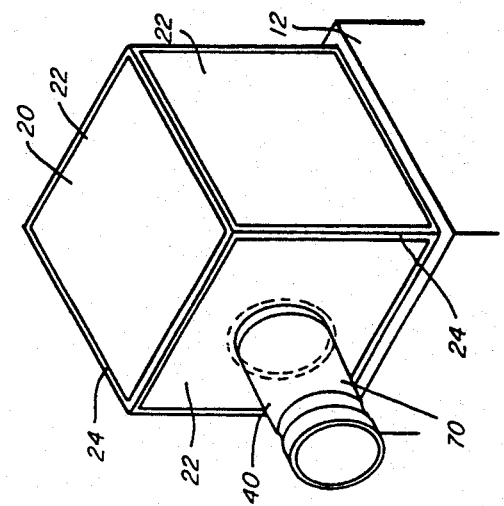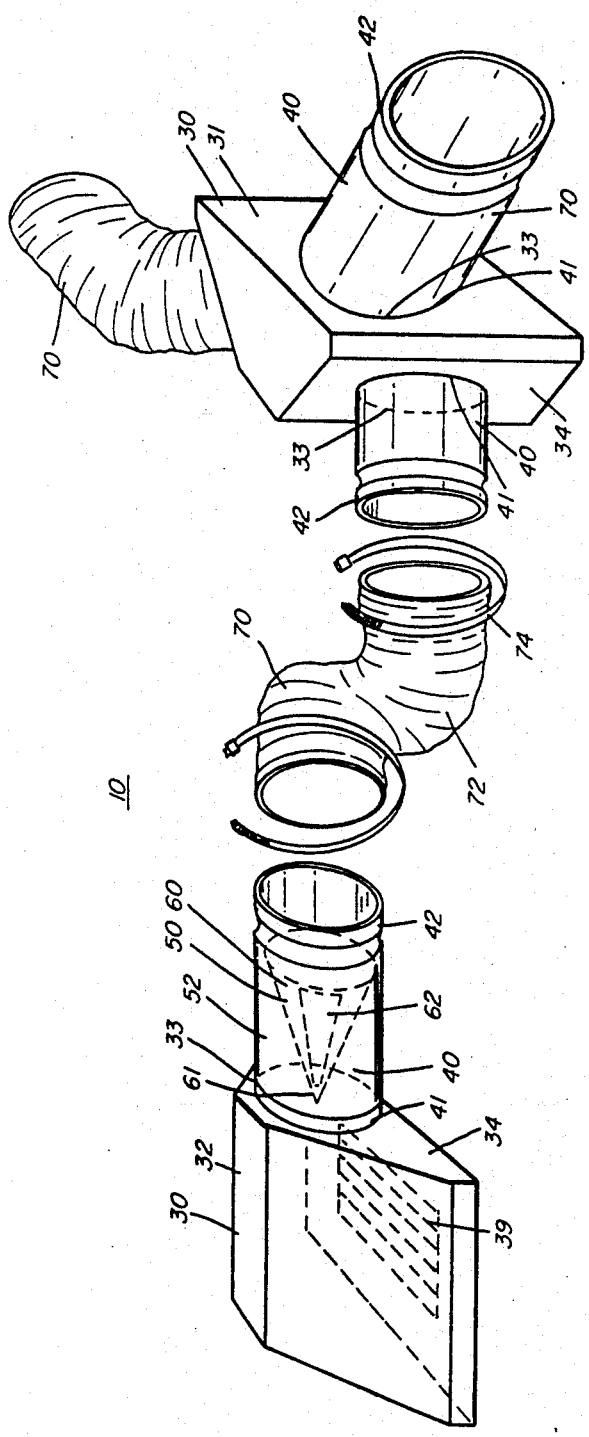
FIG. 1
FIG. 2

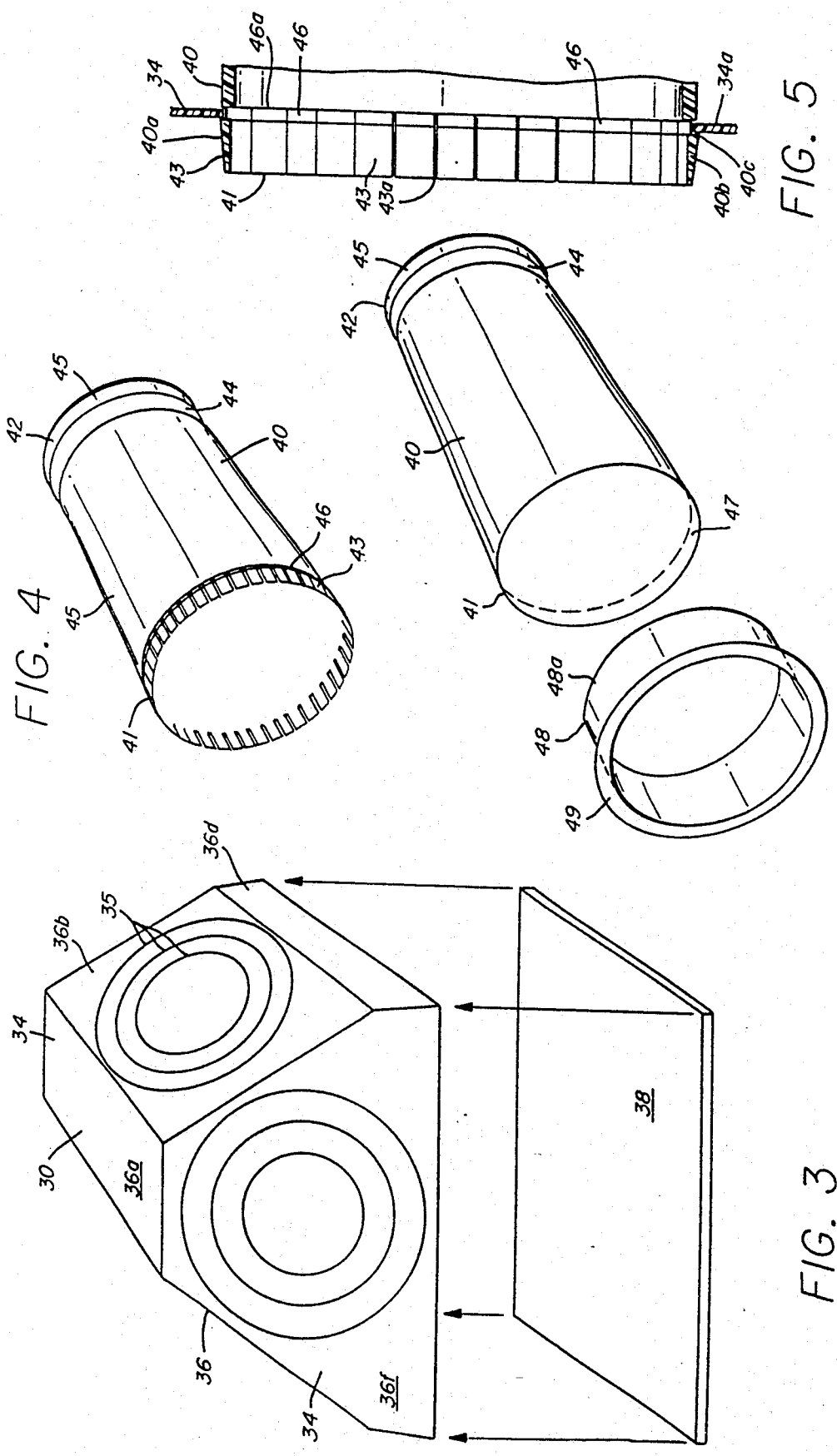

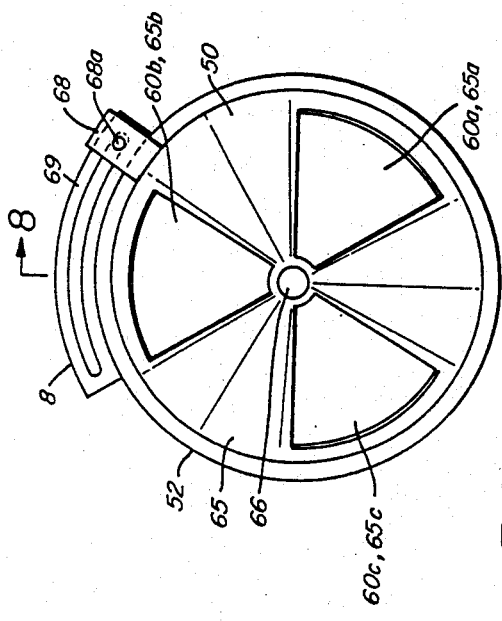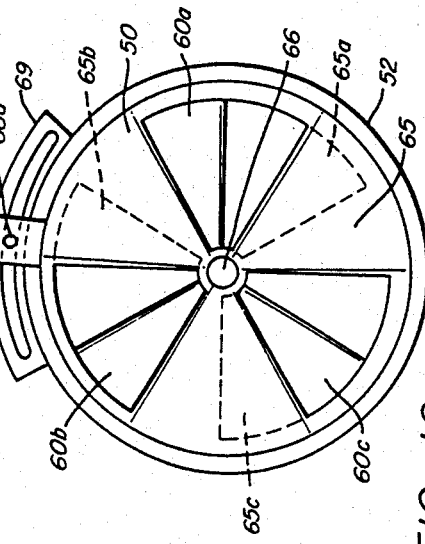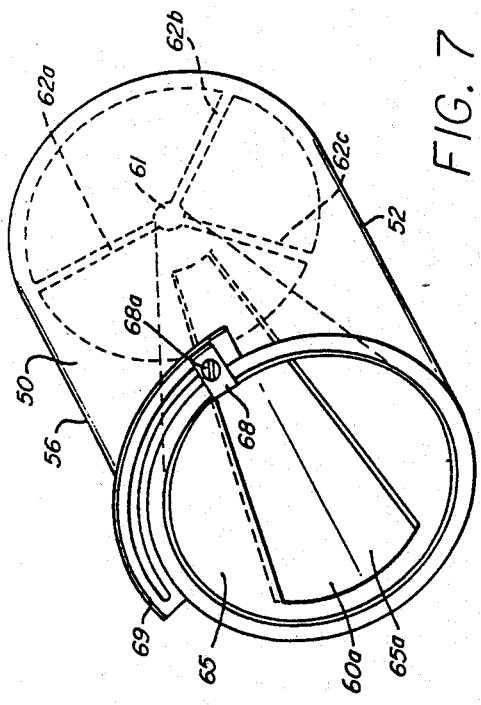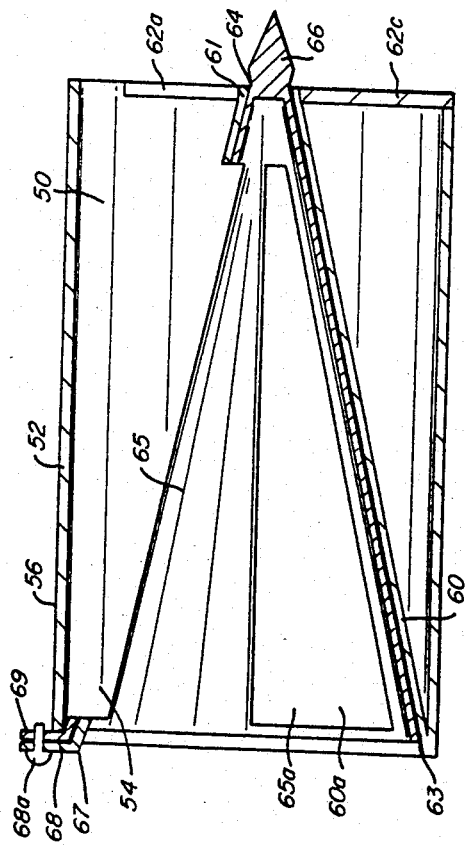

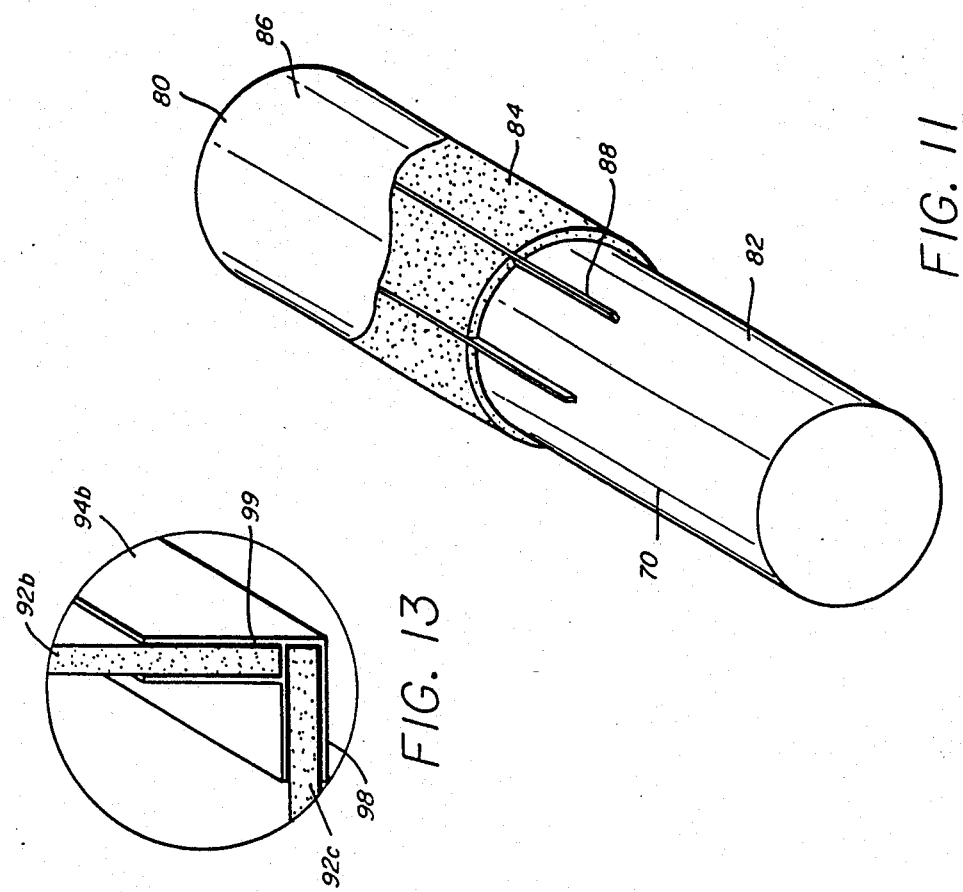
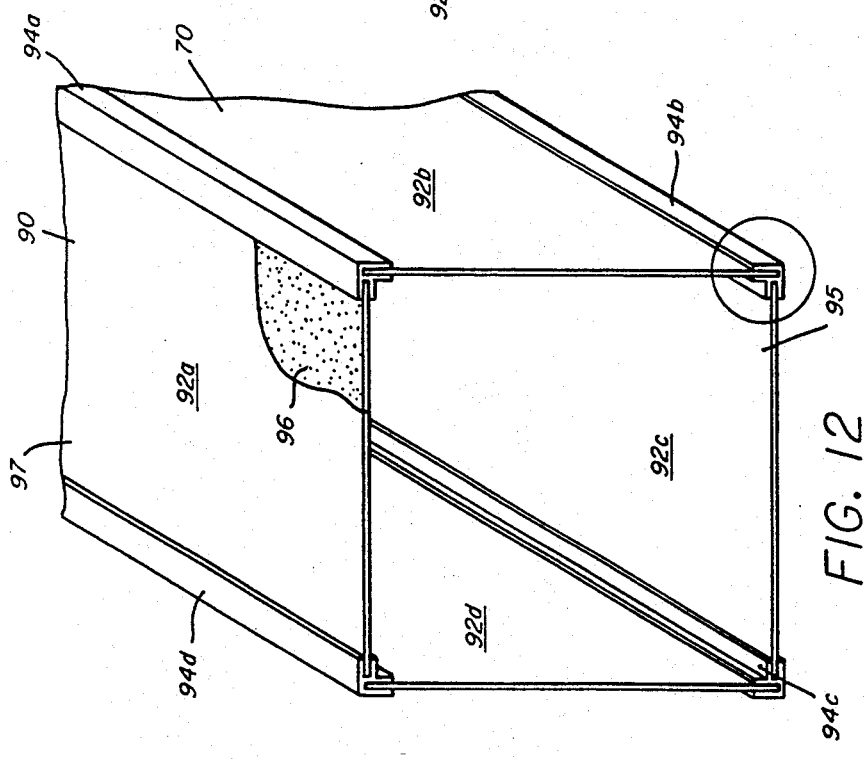

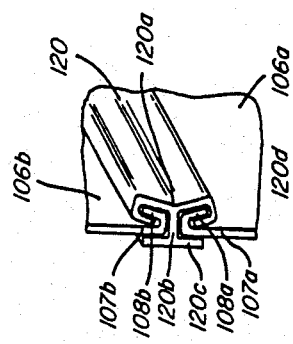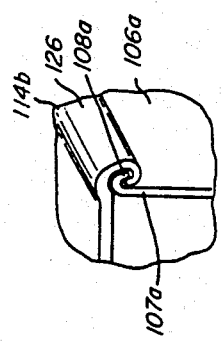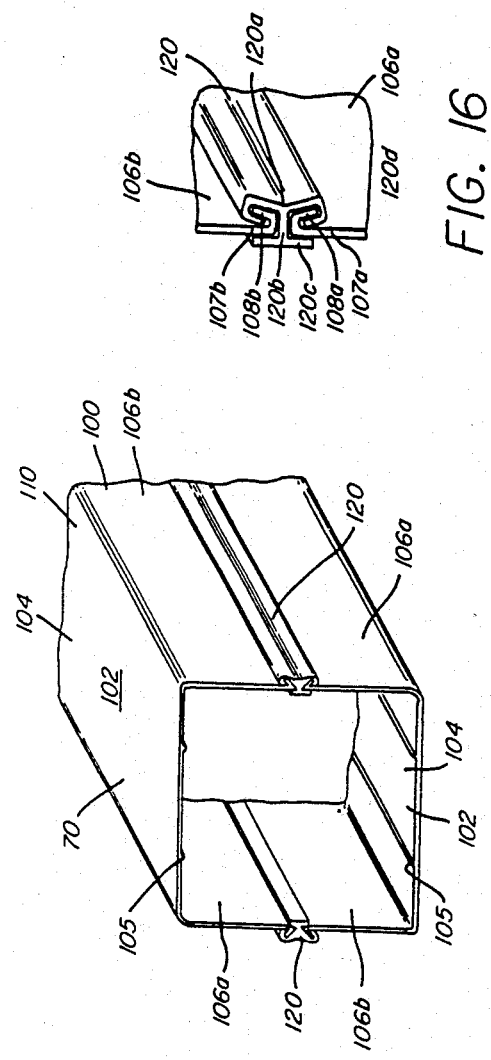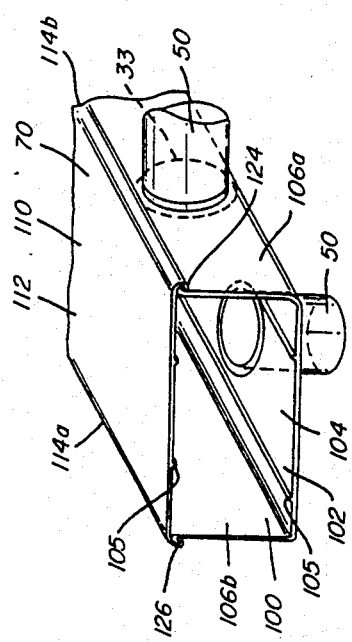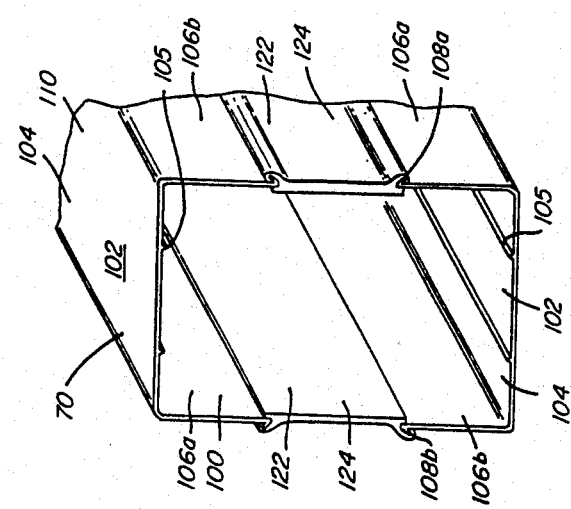

PLASTIC SELF-INSULATING DUCTWORK SYSTEM

This is a division, of Application Ser. No. 07/652,463, filed Feb. 7, 1991 now U.S. Pat. No. 5,095,942 which is a continuation-in-part of U.S. application Ser. No. 07/479,870 filed Feb. 14, 1990, now abandoned.

FIELD OF THE INVENTION

The present invention generally relates to a ductwork system and, more particularly, is concerned with a preformed plastic ductwork system which is self-insulating, adjustable and easy to install. The system can be installed by a nonprofessional as well as a professional.

In recent years, there has been a movement toward the use of prefabricated structures and toward the use of plastics in building structures. A duct system for moving heated and/or cooled air is one example of a system ideal for the use of prefabricated parts or elements. Plastic is an ideal material to be used to construct these elements since it is lighter and cheaper than metal and since it can meet the needs of a ductwork system.

The basic elements of any ductwork system will include a source of the fluid to be conveyed through the system, a valve or damper, a diffuser, splitter elements and various conduits to interconnect the system. Since these systems are installed by the professional as well as the do-it-yourselfer, it is desirable to have a system which may be installed by the non-professional. It is also desirable to have a system which is built and installed at a low cost and a system which is sufficiently insulated.

Other apparatus has been described which can be used as single elements in a ductwork system. U.S. Pat. No. 3,985,158 to Felter describes an insulated diffuser and mounting box. U.S. Pat. No. 2,755,136 to Lum describes a valve having two conical members. U.S. Pat. No. 2,443,071 to Honerkamp et al describes a valve having openings in walls which may be aligned and misaligned. U.S. Pat. Nos. 4,557,297 to Montana, 3,095,014 to Dosker, and 2,489,048 to Rinehart describe ducts constructed with insulating material. U.S. Pat. No. 4,735,235 to Anderson et al describes a system including ducts, transition components and ceiling outlets.

The patents described above have several shortcomings. The patents relating to valves fail to recognize the importance and ease of construction of a valve made from two conical members which can optionally be opened to a position where the surface area of the openings is greater than the cross-sectional area of the conduit. This construction is important since it allows the valve to operate with a minimal pressure drop across the valve to reduce noise and regulate air flow velocity. The other patents relating to individual elements of a ductwork system fail to describe the ease of construction and adaptability of elements that can be made from plastic with an optional foam layer while having sufficient insulation and strength properties. The prior art fails to comprehend that a complete ductwork system can be constructed from prefabricated plastic elements. For instance, the patent to Anderson et al requires the use of metal and the cumbersome bending of tabs over adjoining structures for making a connection. The prior art also fails to recognize that the ductwork can be prefabricated in elements of standard sizes. An entire ductwork system can be designed and constructed from standard sized elements which are adaptable for connection to other elements while serving the needs of the system. The prior art also fails to comprehend that an entire system beyond the source of the fluid can be constructed from three basic prefabricated elements, namely, a distribution box, a valve and duct lines, even where the size requirements for individual components vary throughout the system.

Consequently, a need exists for improvements in complete ductwork systems and individual elements which will result in a system which can be constructed from a few simple and basic prefabricated elements or parts which can be interconnected to form a reliable and dependable system at reduced levels of capital investment and energy consumption.

BRIEF DESCRIPTION OF THE DRAWINGS

FIG. 1 is an exploded perspective view of one example of an assembly of the ductwork system.

FIG. 2 is a perspective view of the transfer assembly connected to a furnace or source of the fluid to be conveyed through the system.

FIG. 3 is an exploded perspective view of a universal distribution box.

FIG. 4 is a perspective view of an adaptor conduit having spring teeth.

FIG. 5 is a detail view of the end of the adaptor conduit showing the spring teeth in engagement with the wall of an element to be attached to.

FIG. 6 is an exploded view of the adaptor conduit used with a glue flange.

FIG. 7 is a perspective view of the value with its housing showing only one aperture.

FIG. 8 is a cross-sectional view of the valve taken along line 8—8 of FIG. 9

FIG. 9 is an end view of the valve showing the apertures in the fully open position.

FIG. 10 is an end view of the valve showing the apertures in the half-open position.

FIG. 11 is a perspective view of the round duct line.

FIG. 12 is a perspective view of the rectangular duct line fabricated from duct board sheets and extruded corner molded pieces.

FIG. 13 is an enlarged view of the rectangular duct line taken from FIG. 12

FIG. 14 is a perspective view of duct line constructed from two troughs connected together by extension connecting beads.

FIG. 15 is a perspective view of duct lines constructed from two troughs held together by connecting beads.

FIG. 16 is an enlarged view of the connecting bead holding the two troughs together in FIG. 15.

FIG. 17 is a perspective view of trough duct line enclosed by a covering structure with branching adaptor conduits connected by glue flanges.

FIG. 18 is an enlarged view of the connecting bead shown in FIG. 17.

SUMMARY OF THE INVENTION

The present invention provides a prefabricated ductwork system designed to satisfy the aforementioned needs. The elements of the ductwork system are designed to provide a system that can be installed by a professional or a nonprofessional with basic hand or power tools and an adhesive. The system is self-insulating, completely airtight, non-allergenic, sterilized, will not corrode or rust, and will not support microbiological growth. These attributes result in an air ductwork system that can be installed in operating rooms, food and drug manufacturing plants, clean rooms and exhaust/ventilation systems for toxic or corrosive gases.

Accordingly, the present invention relates to a system of adjustable prefabricated ductwork for the conveyance of a fluid, normally air. The system uses a distribution box which includes a plurality of walls and a bottom plate. Assembly guidelines may be prefabricated into some of the walls or the bottom plate to act as a guide for the cutting of openings which are used for the connection of conduits. The distribution box may act either as a diffuser boot for discharging air into a room or as a splitter box for directing the air through the system. The distribution box is joined to interconnecting duct lines by adaptor conduits. The adaptor conduits have an attachment means at one end for connection to a wall and at the other end for connection to a duct line. The duct line is used to interconnect the system and may be the same as the adaptor conduits except that they are adapted for connection to other duct line at both ends.

One or more valves are usually included in the system either in duct line or in an adaptor conduit in order to regulate flow through the system. The valve has a housing, a first cone and a second cone. The first cone is supported at its narrow end within the housing by one or more struts. The second cone is rotatable within and concentric with the first cone. The first and the second cone have matching apertures. When the second cone is rotated within the first cone the apertures may be selectively aligned or misaligned to adjust the flow of the fluid through the ductwork system.

DETAILED DESCRIPTION OF THE INVENTION referring now to the drawings, and more particularly, to FIG. 1, there is shown one example of the prefabricated or preformed ductwork system, generally designated 10, for the conveyance of a compressible or non-compressible fluid, usually heated or cooled air with an air conditioning system, which incorporates the preferred embodiment of the present invention. The system generally incorporates three basic elements, namely one or more universal distribution boxes 30, valves 50 and duct line 70. As seen in FIG. 2, plenum box or transfer assembly 20 may also be needed at the upstream end of the system for adapting to the source 12 of the fluid, usually air, to be conveyed through the system 10. Each element may contain from one to three layers where each layer acts as an insulation layer or heat transfer barrier.

Referring back to FIG. 1, the distribution box 30 can act either as a splitter box 31 in the ductwork system or may act as a diffuser boot 32 at the outlet or downstream end of the ductwork system 10. The distribution box 30 and other elements in the ductwork system 10 are interconnected by a network of duct lines 70 which are connected to the distribution boxes 30 by portions of duct line 70 prefabricated as adaptor conduits 40.

The adaptor conduits 40 are also used to connect the ductwork system 10 at the upstream end to the source 12 of the fluid or to the transfer assembly 20. One end 41 of the adaptor conduits 40 are adapted for connection to an opening 33 cut in the wall 34 of a distribution box 30 or any other element to be connected to. The other end 42 of the adaptor conduits 40 are adapted for connection to other portions of dust line 70.

The valve 50 is used to control the flow of the fluid through the ductwork system 10 and as shown has a housing 52 which serves either as a duct line or as an adaptor conduit. The flow of the fluid through the valve 50 is controlled through a second cone 65 which is seated and rotatable around a common longitudinal axis within a first stationary cone 60. Both cones 60 and 65 have apertures 60a, 60b and 60c and 65a, 65b and 65c, respectively. The narrow end 61 of the cones 60 and 65 are preferably located downstream such that the flow of the fluid through the system 10 will urge second cone 65 toward first cone 60 to achieve a better seal.

Referring again to FIG. 2, transfer assembly 20 is constructed from foamed plastic core duct board sheets 22 which are held together by adhesive used in extruded corner molding frames 24 as discussed below for rectangular shaped duct line 90 (FIG. 13). Guidelines similar to those shown in FIG. 3 are optionally molded or prefabricated in the duct board 22 for the cutting of openings to fit standard, widely used sizes of conduit. The duct board 22 could also be prefabricated with openings.

Referring now to FIG. 3, a distribution box 30 is shown. The distribution box has an upper portion 36 prefabricated from seven walls 34, namely, a rectangular top wall 36a, two rectangular upper side walls 36b and, correspondingly, 36c (not shown), two rectangular lower side walls 36d and, correspondingly, 36e (not shown), and two end walls 36f and, correspondingly, 36g (not shown). The upper portion 36 of the distribution box 30 is prefabricated as one piece from a sturdy and lightweight material, preferably plastic with a foamed plastic core. Guidelines or score lines 35 are optionally molded or prefabricated into any of the walls 34. As shown these guidelines 35 are guide circles, but guide squares or any other shape may be molded in as wall. These guidelines 35 are prefabricated in standard dimensions such that a user can cut along a desired line to form an opening 33 used for the connection of a standard size adaptor conduit 40. The distribution box 30 is therefore adaptable to receive a plurality of duct sizes. The thickness of the walls 34 along the guidelines 35 may also be decreased for ease of cutting.

The upper portion 36 of the distribution box 30 is closed on the bottom through the attachment of bottom plate 38. The bottom plate 38 is preferably attached by an adhesive although other suitable attachment means may be used. The bottom plate 38 could also be prefabricated as one assembly with the upper portion 36. The bottom plate 38 may include molded guidelines (not shown), as described above, for the cutting of an opening for the attachment of an adaptor conduit 40 (FIG. 6). The bottom plate 38 may alternatively include molded in guidelines which are rectangular for the cutting of diffuser openings 39 as shown in FIG. 1 when the distribution box 30 is to serve as the diffuser boot 32 at the downstream end of the ductwork system 10 where air enters the room being heated or cooled.

The distribution box 30 can be made with an expanded foam core (not shown) within an inner and outer plastic layer (not shown) for insulation purposes. The guidelines 35 correspond to standard size adaptor conduits 40. However, a user of the distribution box 30 can cut any sized opening 33 in any of the walls 34 or the bottom plate 38 of the distribution box 30. The user can thus alter the distribution box 30 such that it will accommodate and connect to any sized adaptor conduit 40 and such that it will allow the cutting of any sized diffuser opening 39. The distribution box 30 may also be prefabricated with openings 33 or 39.

One example of a standard size prefabricated upper portion 36 useful for installation in a common ductwork system will have dimensions where the top wall 36a is 4-7/16 inches wide, upper side walls 36b and 36c are 8-½ inches wide and lower side walls 36d and 36e are 2-7/32 inches wide. The base of the upper portion 36 will have a length and width of 14.25 inches and there will be 83° between the horizontal and the lower side walls 36d and 36e, 154° between the lower side walls 36d and 36e and the upper side walls 36b and 36c and 123° between the upper side walls 36b and 36c and the top wall 36a. The lines where the walls meet may be rounded corners.

One example of a standard size prefabricated bottom plate 38 useful for installation in a common ductwork system will have dimensions including a ½ inch thickness with a 7° taper along the edges for ease of sliding the bottom plate 38 into the upper portion 36 where the lower side walls 36d and 36e angle 83° from the horizontal. When the distribution box 30 is to be used as a diffuser boot 32, the bottom plate guidelines are centered on the plate in squares of 12×8 inches, 10×6 inches, and 8×4 inches. The length and width of the bottom plate 38 will be 14.15 inches.

Referring now to FIGS. 4, 5 and 6, two embodiments of adaptor conduits 40 are shown. As shown in FIG. 4 one embodiment of an adaptor conduit 40 will include spring teeth 43 as an attachment means at a first end 41 of the adaptor conduit 40. The other end 42 of the adaptor conduit preferably has an annular groove 44 and a neck 45. The annular groove 44 may be rounded, squared or any other concave or convex shape. The annular groove 44 and neck 45 are used for connecting the adaptor conduit 40 to duct lines 70 or other structures like the commonly used flexible plastic duct 72 in the ductwork system 10. Adaptor conduit 40 may be made with one plastic layer or may be made with two plastic layers covering an expanded foam core. The adaptor conduits 40 shown are round although they could be rectangular or any other shape.

As seen in FIG. 5 the spring teeth or projections 43 are tapered teeth which protrude at the end 41 of the adaptor conduit 40 and are prefabricated as part of the adaptor conduit 40. Each projection 43 is tapered on the outer side 40a of the adaptor conduit 40. Each projection 43 is tapered from narrow at the end 41 of the adaptor conduit 40 to broad next to an annular or locking groove 46. The spaces 43a between each tooth or projection 43 and the rigidity of the material allow each projection 43 to move independently in a spring type manner. The spring teeth 43 provide a means for attachment and are used for the connection of the adaptor conduit 40 to an opening 33 in a wall 34. The opening 33 to which the spring teeth 43 will be attached must have a diameter which is larger than the diameter at the end 41 of the adaptor conduit 40 at the narrowest part of the taper 40b of the spring teeth 43 but smaller than the diameter at the broadest part 40c of the taper 40b. When the spring teeth 43 are pushed into the opening 33 to which the adaptor conduit 40 is to be connected, each individual projection 43 will be urged inwardly or depressed until the broadest portion 40c of each projection 43 passes beyond the inner surface 34a of the wall 34 around the opening 33. Each projection 43 will then snap or spring outward radially to lock the mating wall 34 within the annular groove 46. An adhesive may also be used on the annular groove 46 in order to improve the connection between the adaptor conduit 40 and the connecting wall 34.

One example of a standard size prefabricated adaptor conduit 40 with spring teeth 43 useful for installation in a common ductwork system will have an annular groove with a thickness equal to the thickness of a connecting wall 34 plus 1/64 of an inch, an outer diameter of 6 inches, a length of 10-3/16 inches, a neck 45 which is 1-⅛ inches long, an annular groove 44 with a 1-⅛ inch radius, spring teeth 43 which are ⅜ of an inch long from end 41 to the locking groove 46 of the conduit 40, and spring teeth which are ⅛ inch wide.

A second embodiment for attaching an adaptor conduit 40 to a distribution box 30 or other structure is shown in FIG. 6 where distal end 42 preferably includes an annular groove 44 for attachment to duct lines 70 as described above. The proximal end 41 includes an inner or outer adhesion surface 47 to which an adhesive may be applied for the attachment of a flange 48. The flange 48 includes a neck 48a and a projecting rim 49. The projecting rim 49 of the flange 48 provides a support area to which an adhesive may be applied for connecting the flange 48 through an opening 33 to a wall 34. Once the flange 48 is connected through an opening 33 to the wall 34, the neck 48a of the flange 48 can then be connected by an adhesive to the adhesion surface 47 of the adaptor conduit 40. It is to be understood that both embodiments of adaptor conduits 40 as shown in FIGS. 4 and 6 could be made without the annular groove 44 and neck 45 which could be replaced either by spring teeth 43 or an adhesion surface 47 allowing both ends of the conduit to be connected to openings 33 in separate walls 34. Adaptor conduits could also be made to have a square or rectangular cross-section as opposed to round.

Referring now to FIGS. 7 and 8 a valve or damper 50 is shown. The narrow end 61 of the valve 50 is preferably oriented to point downstream such that the pressure of the fluid flow through the system will help to hold the second cone 65 within the first cone 60 to achieve a better seal between the cones. The valve 50 generally includes a housing 52, a first cone 60 and a second cone 65. The housing 52 is prefabricated to serve as a portion of the duct line 70, preferably as an adaptor conduit 40. The first cone 60 is fixed with respect to the housing 52. The narrow end 61 of the first cone 60 is fixed by adhesive or other suitable means and supported within said housing by three struts 62a, 62b and 62c which are preferably spaced 120° apart and which extend radially from the narrow end 61 of the cone 60 to the inner wall 54 of the housing 52. The broad end or rim 63 of the first cone 60 is joined to the housing surface 54 either during the prefabrication process or in the field preferably by an adhesive. The second cone 65 is seated within the first cone 60, is concentric with the first cone 60 and is rotatable within the first cone 60. The narrow end 66 of the second cone 65 preferably snaps into a smooth surfaced hole 64 in the narrow end 61 of the first cone 60. However, other methods of attachment which allow rotation may also be used such as a hooked lip on the broad end of the first cone which holds the rim of the second cone (not shown). Each of cones 60 and 65 are prefabricated with smooth surfaces to allow ease of rotation.

Both the first cone 60 and second cone 65 have one or more curvilinear shaped apertures 60a, 60b, 60c and 65a, 65b and 65c, respectively. When the cones 60 and 65 are properly aligned in a fully open configuration, the apertures 60a, 60b and 60c on the first cone 60 are positioned to match with the apertures 65a, 65b and 65c on the second cone 65. The solid portions of the cones 60 and 65 are left between the apertures 60a, 60b, 60c and 65a, 65b and 65c, respectively, which will cover the total area of the apertures 60a, 60b, 60c and 65a, 65b and 65c when the apertures 60a, 60b, 60c and 65a, 65b and 65c are fully non-aligned to close the valve 50. The second cone 65 may thus be rotated anywhere from and between a position where the apertures 60a, 60b, 60c and 65a, 65b and 65c are covered and the valve 50 will be fully closed to a position where the matching apertures 60a, 60b, 60c and 65a, 65b and 65c are fully aligned and the valve 50 will be fully opened, as shown in FIG. 9. FIG. 10 shows the valve 50 in the half-open position. A preferred first cone 60 and a preferred second cone 65 will have three apertures 60a, 60b 60c and 65a, 65b and 65c which are substantially triangular shaped and spaced equidistantly around the surface of each cone 60 and 65. However, only one aperture is shown in FIG. 7.

The rim 67 of the second cone 65 may support a positioning or locking arm 68 which rides against an arcuate channel 69 affixed to the outer surface 56 of the housing 52. The opening and closing of the valve 50 can be controlled by the positioning of the locking arm 68 or may be controlled by a pneumatic or electric actuator (not shown) for controlling or varying the air volume within the ductwork system 10. Preferably, when the valve 50 is fully opened the combined area of the apertures 60a, 60b, 60c and 65a, 65b and 65c will be greater than the cross-sectional area of the housing, duct line or conduit in which it is mounted.

One example of a standard size prefabricated valve 50 useful for installation in a common ductwork system will have a housing 52 with inner diameter D. The base of each of the apertures 60a, 60b, 60c and 65a, 65b and 65c in the cones 60 and 65 will have a length D/2 and the height of each of the apertures 60a, 60b, 60c and 65a, 65b and 65c will be 3 D/2. The area of each of the apertures 60a, 60b, 60c and 65a, 65b and 65c will be 0.375 D/2. As seen in FIG. 9 preferable triangular apertures will cover 58° with 62° between each aperture. One example of a prefabricated valve 50 will have dimensions as follows: D=6 inches, the area of each aperture will equal 13.5 square inches which when fully-open will give a total flow through area of 40.5 square inches, and the cross-sectional area of the conduit will be 28.3 square inches.

The valve 50 may be adapted to rectangular duct line 90 by making housing 52 with a rectangular cross-section and extending the broad end 63 of first cone 60 to include a rectangular flange with the diameter at the broad end being approximately the same as the width of the duct line 90. The area of the apertures when fully open can be constructed to exceed the cross-sectional area of the conduit.

The valve 50 could also be made with cones having apertures shaped as rectangular slots, round holes or any other useful shape. The valve 50 may be used to modulate the flow of any fluid system whether compressible or noncompressible. An expanded foam core layer and/or another plastic layer can be added to the valve 50 for added insulation and rigidity. The positioning of the locking arm 68 may be set in place within the channel 69 by a set screw or projection 68a or other securing device. A static pressure or velocity sensor may be used to control an electric or pneumatic actuator which is used in the system to control the valve 50.

The duct lines 70 are used for interconnecting and conveying the fluid to and from the various elements of the ductwork system. As shown in FIG. 1 the duct lines 70 may be any common flexible duct line 72 for connection by a drawband 74 secured to the annular groove 44 at one end of the adaptor conduits 40 or other duct lines 70.

Another embodiment of duct line 70 is shown in FIG. 11. Duct line 80 is round and may be composed of one or more layers. As shown, duct line 80 includes three layers including a thin plastic inner layer 82 which is covered by an expanded foam core 84 which is then covered by a thin plastic outer layer 86. In larger sizes, plastic rib stiffeners 88 will preferably be included within the expanded foam core layer 84 to provide support to the round duct line 80. The plastic rib stiffeners 88 are longitudinally aligned and equidistantly spaced around the circumference of the round duct lines 80.

The round duct line 80 is preferably fabricated in common sizes having an inner diameter of 6, 8, 10, 12 and 14 inches or larger. The round duct line 80 shall come in standard lengths and is joined at one or both by using plastic cement with or without flange 48, by annular grooves similar to annular groove 44 used in conjunction with flexible duct line 72 and drawbands 74, by any other useful means of attachment such as spring teeth 43 on adaptor conduit 40 or by any combination thereof. The round duct line 80, as shown in FIG. 11, would by connected to adjacent duct line 80 or adaptor conduit 40 by adhesive. In one example of standard sized prefabricated duct line 80 useful for installation in a common ductwork system the inner and outer thin plastic layers 82 and 86 shall be approximately 0.040 to 0.050 of an inch thick and the expanded foam core 84 shall be approximately 1/25 of an inch thick. The round duct line 80 can be with a hand saw or other hand or power tools to fit into the ductwork system 10 to be installed.

FIG. 12 shows another embodiment of duct line 70 which is a rectangular shaped duct line 90. The rectangular duct line 90 is fabricated from four foam core sheets 92a, 92b, 92c and 92d and held together by an adhesive used in conjunction with four lengths of extruded corner molding frames or pieces 94a, 94b, 94c and 94d. The foam core duct board 92a, 92b, 92c and 92d preferably has a thin plastic inner layer 95 which is covered by an expanded foam core 96 which is in turn covered by a thin plastic outer layer 97. Two adjacent duct board walls 92 are joined together with adhesive in adjoining extruded corner molding slots 98 and 99 as shown in FIG. 13. The size of the rectangular duct 90 can be adjusted according to the design needs of the ductwork system 10 to be installed. Each wall of the rectangular duct board 92 can be cut as desired from flat sheets to fit the design needs of the system. Openings can be cut in the rectangular duct walls for the connection of adaptor conduits using either snap lock collars or adhesive flange collars at the option of the installer.

FIGS. 14–18 show yet another embodiment of duct line 70 utilizing an extruded plastic trough 102 to form trough duct line 100. The trough duct line 100 is preferably U-shaped and is prefabricated in standard sizes. As shown, the trough 102 has a base wall 104 and two side walls 106a and 106b. The base wall 104 will preferably have stiffening ribs 105 to add support to the trough 102. Referring to FIGS. 16 and 18, the top ends 107a and 107b of the side walls 106a and 106b include outwardly extending hooking projections 108a and 108b for use in connecting a covering structure 110 to the trough 102. The hooking projections 108a and 108b preferably intersect the side walls 106a and 106b at an angle ranging from 30° to 45°.

As shown in FIG. 14 and FIG. 15 the covering structure 110 may be another trough 102 which is connected along the hooking projections 108a and 108b by a connecting bead 120, 122 or 124. FIG. 15 shows a double sized duct 100 where one trough 102 is connected on top of the other trough 102 through the use of slender connecting beads 120. The size of the trough duct line 100 can also be adjusted by including an extension wall 124 in the connecting bead 122 as shown in FIG. 14. A seven inch extension wall 124 would be preferable. The extension connecting bead 122 is preferably made from a rigid material and the slender connecting bead 120 may be made from either a rigid or flexible material.

A preferred connecting bead 120 as shown in FIG. 16 includes a base 120c and a "Y"-shaped portion 120a where the trunk of the "Y" 120b is optionally squeezed together by the connecting bead 120. Hooking portions 120d are located at the ends of the arms on "Y"-shaped portion 120a. However, the connecting bead may simply slide over the hooking projections 108a and 108b in a dovetail fashion to clamp the two troughs 102 together. An adhesive may be used in conjunction with the connecting beads 120, 122 and 124 in order to improve the connection to the troughs 102.

Referring now to FIG. 17, a covering structure 110 for a smaller trough line 100 can be prefabricated as a rigid wall 112 having one sided connecting beads 126 as shown in FIG. 18 along both edges, 114a and 114b, of the rigid wall 112 as shown. One sided connecting beads 126 are similar to connecting bead 120 less base 120c and half of "Y" shaped portion 120a. This covering structure 110 will be placed over the top of the trough 102 by sliding the beads 126 over the hooking projections 108a and 108b for locking engagement. The covering structure 110 may include stiffening ribs 105 to increase the stability of the structure 110.

Some examples of standard sizes for the trough 102 useful for installation in a common ductwork system are as follows:

| Length of Side Wall 106 by Length of Base Wall 104 (inches) |
| --- |
| 7 × 14 |
| 14 × 14 |
| 21 × 14 |
| 3 × 14 (branch duct) |

An example base wall 104 of the 7×14 inch prefabricated trough 102 will have seven inches between the stiffening ribs 105 and 3 and ½ inches between the stiffening ribs 105 and either of side walls 106a to 106b. An example connecting bead 120 will have base 120c which is ⅝ of an inch long.

Rectangular shaped duct line 90 can be joined at one or both ends by means similar to those described above for round duct line 80, or the end may be closed off and branch connections made with adaptor conduits 40.

It is to be understood that connections can be made to and from any duct line 70 described above by cutting an opening 33 in the duct line 70 and making a connection with an adaptor conduit 50. FIG. 17 shows an example of such connections used in trough duct line 100. Openings 33 may be cut in the side walls 106a and 106b, the base 104 or even the covering structure 110 of the duct line 100 as well as any other duct line 70 in order to make a connection with an adjoining portion of duct line 70. Duct line 70 could also be prefabricated with guidelines 35 or with openings 33. The trough shaped duct line 100 as well as any other duct line 70 may be prefabricated with a expanded foam liner layer having an additional plastic layer for insulating and stabilizing the duct line if desired. Any duct line 70 may be cut to desired lengths and adhered or attached by other suitable means together as desired.

All of the duct line 70 described may be prefabricated to include preformed elbows, tees and/or end caps to be used in the ductwork system 10 as needed.

All plastic layers and all expanded foam layers may be formulated to meet any required conditions of insulation, service, fire regulation or special requirements or any sort. All elements described above, except the foam core and drawbands, are preferably made from plastic. However, a light metal, such as aluminum, can also be used for any of the elements described above. High temperature CPVC is a preferred plastic. A preferred adhesive is PVC adhesive. Expanded foam core may be made of styrofoam, expanded polyurethane, expanded polystyrene or other materials depending upon the insulation and strength needs of the system. Expanded foam core and an additional layer may be glued to any element prefabricated with only one layer to increase the rigidity and insulation properties of the element.

Guidelines 35 or 39 may be prefabricated into walls of any of the components used in the ductwork system 10. The guidelines 35 are prefabricated to correspond with standard sized adaptor conduits 40.

The preferred embodiment of this invention has been shown and described above. Also, as used throughout this specification, the term "plastic" can be construed to name any commonly used or adaptable plastic material, whether film, sheet foam or composite. It is to be understood that minor changes in the details, constructions and arrangement of the parts may be made without departing from the spirit or scope of the invention as claimed.

I claim:

1. A duct line for use in a ventilation ductwork system, comprising:
   first and second duct work each having a substantially planar configuration and including a sheet-like inner layer, a sheet-like outer layer, and an insulating core material sandwiched between the inner and the outer layer; and
   a plurality of corner moldings for interconnecting the first duct wall with the second duct wall normal to the first duct wall, each corner molding having a first elongate slot therein for receiving the first duct wall, and a second elongate slot therein normal to the first elongate slot for receiving the second duct wall.

2. The duct line as defined in claim 1, wherein each of the inner and the outer layers are fabricated from a plastic sheet, and the insulating core comprises an expanded foam material.

3. The duct line as defined in claim 1, further comprising:

a plurality of rib stiffeners each passing through the insulated core layer and extending between the inner and the outer sheet layers for enhancing the structural strength of the duct line.

4. A duct line for use in a ventilation ductwork system, comprising:

a trough having two spaced apart side walls and a base wall, each of the side walls including an elongate wall attachment means adjacent a top surface of and extending from the respective side wall;

a covering structure having a top wall, said covering structure including cover attachment means for connection to each of said elongate wall attachment means; and each of said trough and covering structure including a sheet-like plastic inner layer, a sheet-like plastic outer layer, and an expanded foam material core sandwiched between the inner plastic layer and outer plastic layer.

5. The duct line as defined in claim 4, further comprising:

a plurality of rib stiffeners passing through the insulated core layer and extending between the inner and the outer sheet layers for enhancing the structural strength of the duct line.

6. The duct line as defined in claim 4, wherein said duct line includes first and second duct walls each having a substantially planar configuration, and said duct line further comprising:

a plurality of corner moldings for interconnecting the first duct wall with the second duct wall normal to the first duct wall, each corner molding having a first elongate slot therein for receiving the first duct wall, and a second elongate slot therein normal to the first elongate slot for receiving the second duct wall.

* * * * *